United States Patent
Nagase et al.

(10) Patent No.: US 10,031,870 B2
(45) Date of Patent: Jul. 24, 2018

(54) SEMICONDUCTOR DEVICE AND CONTROL METHOD THEREOF

(71) Applicant: Renesas Electronics Corporation, Tokyo (JP)

(72) Inventors: Hirokazu Nagase, Tokyo (JP); Shunichi Kaeriyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 235 days.

(21) Appl. No.: 14/992,794

(22) Filed: Jan. 11, 2016

(65) Prior Publication Data

US 2016/0267029 A1    Sep. 15, 2016

(30) Foreign Application Priority Data

Mar. 13, 2015   (JP) ................................. 2015-050607

(51) Int. Cl.
    *G06F 13/24*    (2006.01)
    *G06F 13/40*    (2006.01)

(52) U.S. Cl.
    CPC .......... *G06F 13/24* (2013.01); *G06F 13/4068* (2013.01)

(58) Field of Classification Search
    CPC ............................. G06F 13/24; G06F 13/4068
    See application file for complete search history.

(56) References Cited

U.S. PATENT DOCUMENTS

| | | | |
|---|---|---|---|
| 2007/0097985 A1* | 5/2007 | Lee ....................... | H04L 1/0009 370/395.21 |
| 2013/0019072 A1* | 1/2013 | Strasser .............. | G06F 11/1044 711/154 |
| 2014/0337553 A1* | 11/2014 | Du .......................... | G06F 13/24 710/267 |
| 2015/0286607 A1* | 10/2015 | Cvejanovic ......... | G06F 11/3055 710/110 |

FOREIGN PATENT DOCUMENTS

| JP | 2001-217849 A | 8/2001 |
|---|---|---|
| JP | 2011-086120 A | 4/2011 |

* cited by examiner

*Primary Examiner* — Nimesh G Patel
(74) *Attorney, Agent, or Firm* — McGinn IP Law Group, PLLC

(57) ABSTRACT

According to one aspect, a module 11_1 includes a communication circuit 111 that performs data communication with an externally-provided control device 12 through a communication bus 13, and an interrupt signal generation circuit 113 that, when an interrupt instruction signal I1 output from the communication circuit 111 becomes an active state, generates an interrupt signal and outputs the generated interrupt signal to the communication bus 13, the interrupt signal being defined by using a bus potential undefined in a data communication standard.

20 Claims, 16 Drawing Sheets

SEMICONDUCTOR DEVICE AND CONTROL METHOD THEREOF

CROSS-REFERENCE TO RELATED APPLICATIONS

This application is based upon and claims the benefit of priority from Japanese patent application No. 2015-050607, filed on Mar. 13, 2015, the disclosure of which is incorporated herein in its entirety by reference.

BACKGROUND

The present invention relates to a semiconductor device and a control method thereof. For example, the present invention relates to a semiconductor device and a control method thereof suitable for swiftly sending an interrupt signal without increasing the number of signal lines.

For data communication between a controller and a module, an I2C (Inter-Integrated Circuit) method has been widely used as the communication mode. In the I2C communication, since the controller can be connected with a plurality of modules through a common bus, the number of signal lines can be reduced. For example, the I2C communication method is adopted even for data communication performed in small robotic electrical appliances and personal mobility (i.e., personal vehicles).

It should be noted that in a system in which a number of modules such as motors and sensors mounted in a small robotic electrical appliance or personal mobility (i.e., personal vehicle) operate in cooperation, there is a possibility that an abnormality which may occur in one of these modules could have a harmful effect on other modules and hence cause the system to malfunction as a whole. To prevent such a malfunction, it is desirable to immediately detect the occurrence of the abnormality in one of the modules and stop the operation of the entire system without delay.

Japanese Unexamined Patent Application Publication No. 2011-086120 discloses related art. In particular, Japanese Unexamined Patent Application Publication No. 2011-086120 discloses a configuration in which an interrupt handling circuit is provided in each circuit board and an interrupt signal is output from a circuit board where an abnormality occurs to other circuit boards through a dedicated signal line.

However, the configuration disclosed in Japanese Unexamined Patent Application Publication No. 2011-086120 requires a signal line(s) dedicated to an interrupt signal(s), thus causing a problem that the number of signal lines increases. As a result, in particular, when a large-scale system including a number of modules is constructed, the cost increases and the packing property deteriorates.

Japanese Unexamined Patent Application Publication No. 2001-217849 discloses a countermeasure against this problem. In a configuration disclosed in Japanese Unexamined Patent Application Publication No. 2001-217849, a master station incorporates data for an interrupt into a synchronous data and transmits the synchronous data including the interrupt data, and each of a plurality of slave stations receives the synchronous data and detects (i.e., determines) whether or not the interrupt is for the own station. This makes it possible to notify the slave stations of the interrupt signal without increasing the number of signal lines.

SUMMARY

However, the present inventors have found the following problem. Namely, in the configuration disclosed in Japanese Unexamined Patent Application Publication No. 2001-217849, an interrupt signal is transmitted from the master station to each of the plurality of slave stations. Specifically, when the operation of the entire system needs to be stopped upon the occurrence of an abnormality in a given slave station, the master station first detects the slave station where an abnormality has occurred through data communication with each of the plurality of slave stations and then outputs an interrupt signal for stopping the operation to the plurality of slave stations. That is, upon the abnormality occurring in the given slave station, the time needed from after this occurrence to send the interrupt signal to each of the plurality of slave stations changes depending on the level of congestion on the communication line to each slave station. Therefore, there is a possibility that the interrupt signal cannot be swiftly sent in the above-described configuration. As a result, for example, there is a possibility that the stop of the operation of the entire system could be delayed. Other objects to be solved and novel features will be more apparent from the following description in the specification and the accompanying drawings.

A first aspect of the present invention is a semiconductor device including: a communication circuit that performs data communication with an externally-provided control device through a bus; and a first interrupt signal generation circuit that, upon receiving an interrupt instruction from the communication circuit, generates an interrupt signal and outputs the generated interrupt signal to the bus, the interrupt signal being defined by using a bus potential undefined in a data communication standard.

Another aspect of the present invention is a control method of a semiconductor device including: performing, by using a communication circuit, data communication with an externally-provided control device through a bus; and generating, upon receiving an interrupt instruction from the communication circuit, an interrupt signal and outputting the generated interrupt signal to the bus, the interrupt signal being defined by using a bus potential undefined in a data communication standard.

According to the above-described aspect, it is possible to provide a semiconductor device and a control method thereof capable of swiftly sending an interrupt signal without increasing the number of signal lines.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiments are explained hereinafter with reference to the drawings. It should be noted that the drawings are made in a simplified manner, and therefore the technical scope of the embodiments should not be narrowly interpreted based on those drawings. Further, the same components are assigned the same symbols and their duplicated explanations are omitted.

In the following embodiments, when necessary, the present invention is explained by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

First Embodiment

Figure 1:
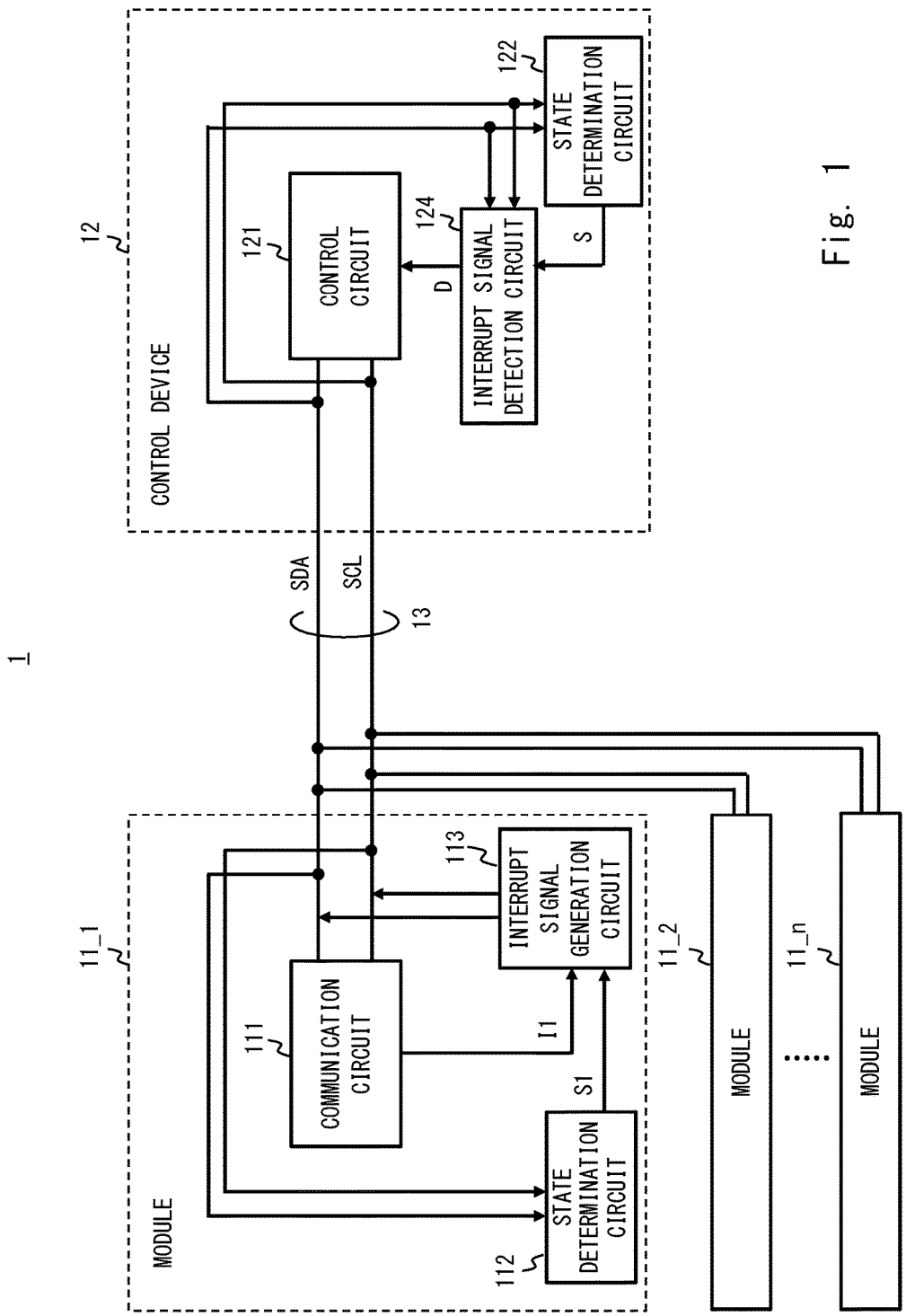
FIG. 1 shows a configuration example of a semiconductor system according to a first embodiment.

FIG. 1 is a block diagram showing a configuration example of a semiconductor system 1 according to a first embodiment. In the semiconductor system 1, when an abnormality occurs in a given module, that module itself generates an interrupt signal that is newly defined by using a bus electric potential (hereinafter simply called a "bus potential") undefined in the data communication standard, and outputs the generated interrupt signal to a control device. As a result, in the semiconductor system 1, the module can notify the control device of the interrupt signal even when the semiconductor system 1 is in an idle state where no communication is performed, thus making it possible to swiftly perform a process corresponding to the interrupt signal such as a process for stopping the operation of the entire system. Further, this configuration does not increase the number of signal lines. A detailed explanation of the semiconductor system 1 is given hereinafter.

As shown in FIG. 1, the semiconductor system 1 includes a control device 12, a module (semiconductor device) 11_1 to 11_n (n is a natural number), and a communication bus 13 that connects the control device 12 with the modules 11_1 to 11_n. Data communication is performed between the control device 12 and the modules 11_1 to 11_n through the communication bus 13.

Note that this embodiment is explained by using an example case where the I2C communication method is used as the method for data communication between the control device 12 and the modules 11_1 to 11_n. That is, the communication bus 13 includes at least a clock signal line SCL and a data signal line SDA. Further, the outputs of the modules 11_1 to 11_n are connected to the communication bus 13 in a wired-OR connection. Further, a pull-up resistance (not shown) is connected to the communication bus 13. Therefore, the negative-OR (i.e., negative logical sum) of the outputs of the modules 11_1 to 11_n and the negation of the output of the control device 12 are output to the communication bus 13. Note that because of the wired-OR connection characteristic, the potential of each of the signal lines SDA and SCL included in the communication bus 13 can be forcibly pulled down to an L-level (i.e., low level) by the output of any one of the modules 11_1 to 11_n and the control device 12. By using this characteristic, this embodiment makes it possible to swiftly send an interrupt signal from a module where an abnormality occurs without increasing the number of signal lines.

Figure 2:
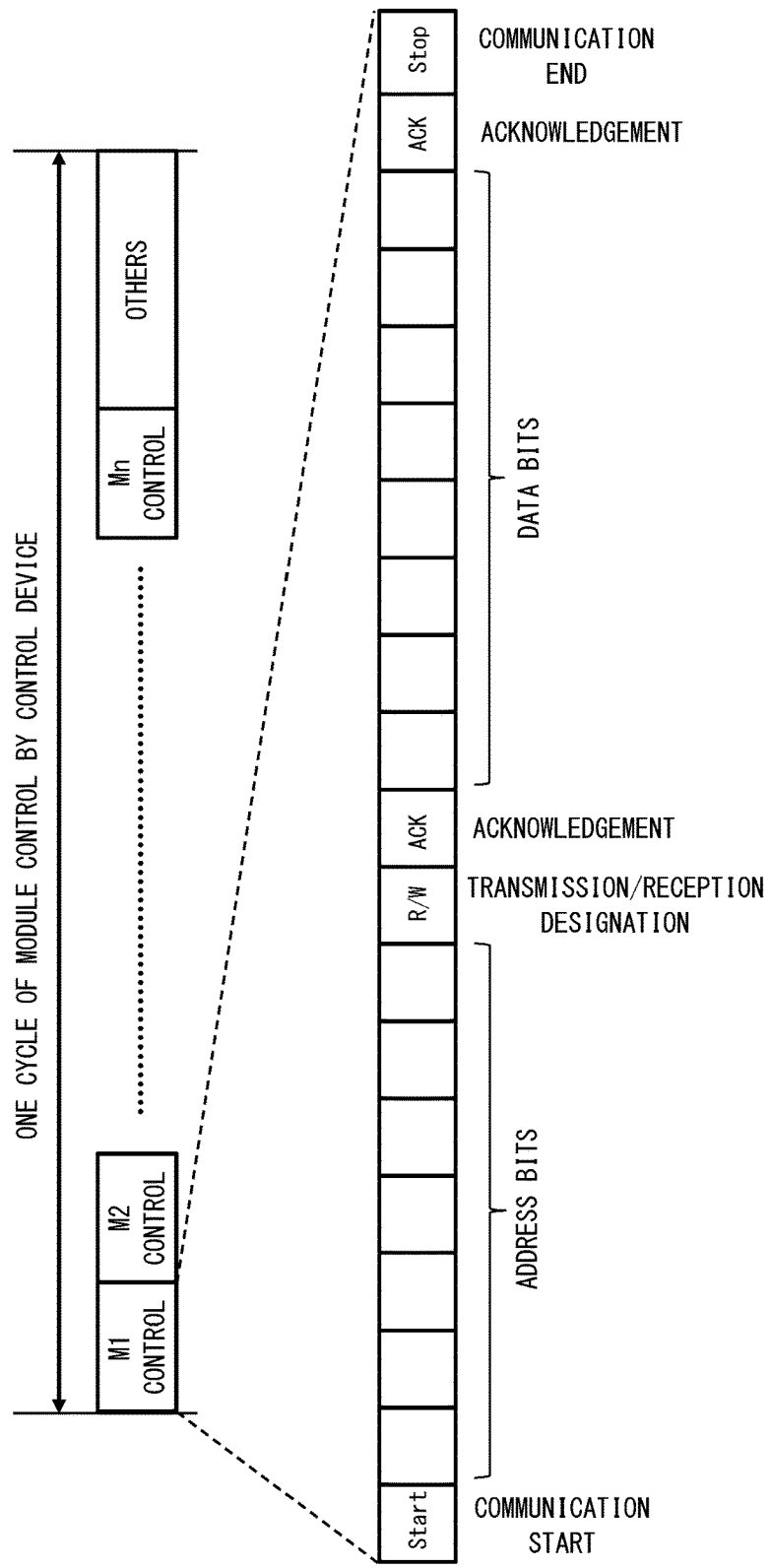
FIG. 2 shows an example of a data set used in data communication performed by the semiconductor system shown in FIG. 1.

FIG. 2 shows an outline of data communication performed by the semiconductor system 1.

Since the outputs of the modules 11_1 to 11_n are connected to the communication bus 13 in the wired-OR connection as described above, the control device 12, which is a master device, needs to perform data communication with one of the modules 11_1 to 11_n, which are slave devices, in a one-to-one manner in the semiconductor system 1. In the example shown in FIG. 2, in particular, the control device 12 successively performs data communication with the modules 11_1 to 11_n one after another.

Further, in data communication between the control device 12 and each of the modules 11_1 to 11_n, the control device 12 first transmits a start signal indicating the communication start. After that, the control device 12 transmits an address (an address having a 7-bit width in this example) of a module with which the control device 12 communicates (hereinafter called a "communication-target module") in a serial manner and then transmits a read/write selection signal indicating whether the communication is a transmission or reception. After that, upon receiving an ACK (acknowledge) signal from the communication-target module, the control device 12 transmits/receives data (data having an 8-bit width in this example) to/from the communication-target module in a serial manner. After that, upon receiving an ACK signal from the communication-target module, the control device 12 transmits a stop signal indicating the communication end. A process like this is repeatedly performed between the control device 12 and each of the modules 11_1 to 11_n.

Figure 3:
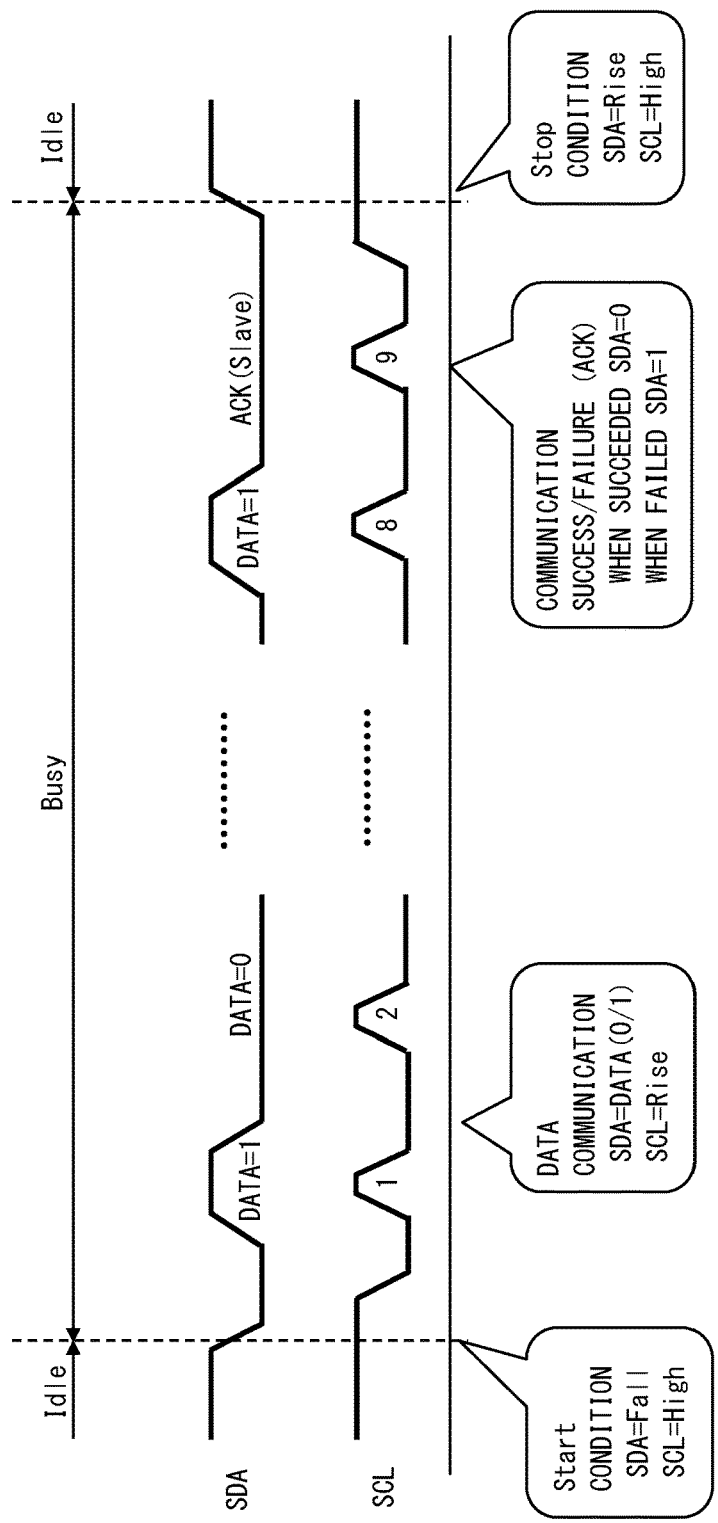
FIG. 3 is a timing chart showing an example of a normal operation of the semiconductor system shown in FIG. 1.

FIG. 3 is a timing chart showing an example of a normal operation of the semiconductor system 1.

Figure 4:
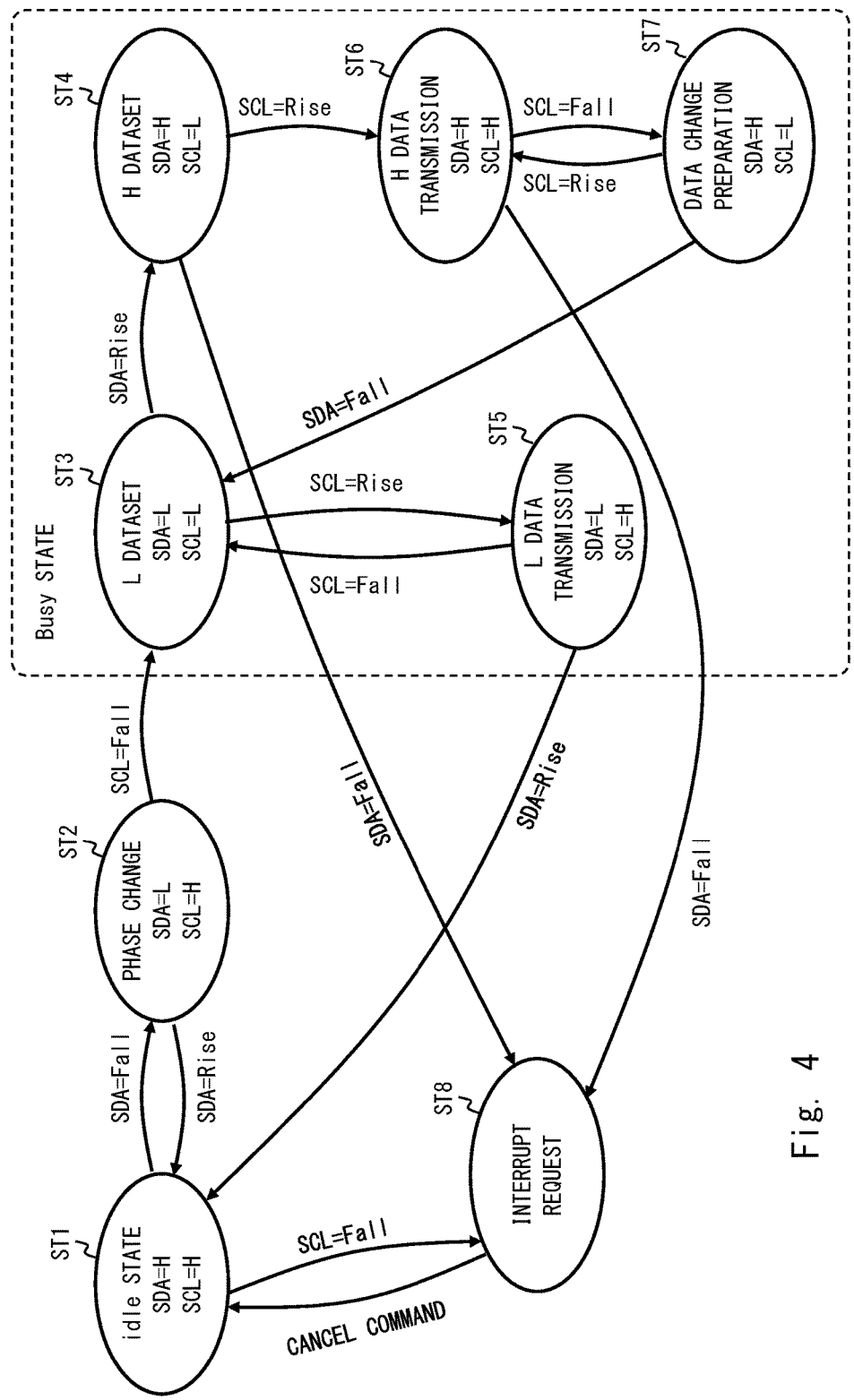
FIG. 4 is a state transition diagram of the semiconductor system shown in FIG. 1.

Further, FIG. 4 is a state transition diagram of the semiconductor system 1. The following explanations are given while referring to this state transition diagram as required.

As shown in FIG. 3, in an initial state, the communication bus 13 is in an idle state where no data communication is performed (ST1 in FIG. 4). That is, the potentials of both of the signal lines SDA and SCL (hereinafter also referred to as "signals SDA and SCL") are at an H-level (i.e., high level).

When the state of the communication bus 13 is changed from the idle state to a busy state (a state where data communication is performed), the control device 12 changes the signal SDA from the H-level to an L-level while maintaining the signal SCL at the H-level (ST2 in FIG. 4). As a result, the communication bus 13 enters the busy state.

After that, as shown in FIG. 2, data communication is performed between the control device 12 and each of the modules 11_1 to 11_n. For example, when the module 11_1 transmits L-level data to the control device 12, the module 11_1 sets the signal SDA to an L-level while the signal SCL is at an L-level (ST3 in FIG. 4) and transmits the L-level signal SDA in synchronization with a rising edge of the signal SCL (ST5 in FIG. 4). On the other hand, when the module 11_1 transmits H-level data to the control device 12, the module 11_1 sets the signal SDA to an H-level while the signal SCL is at an L-level (ST4 in FIG. 4) and transmits this H-level signal SDA in synchronization with a rising edge of the signal SCL (ST6 in FIG. 4). After that, when the module 11_1 transmits subsequent data, the signal SDA is set to an L-level or an H-level (ST3 or ST6 in FIG. 4) after the signal SCL falls (ST7 in FIG. 4). When all the data communication has been completed and hence the state of the communication bus 13 is changed from the busy state to an idle state, the control device 12 changes the signal SDA from the L-level to an H-level while the signal SCL is at an H-level. As a result, the communication bus 13 enters the idle state (ST5->ST1 in FIG. 4).

Next, each component is explained in detail.

(Modules 11_1 to 11_n)

Each of the modules 11_1 to 11_n is a circuit that performs data communication with the control device 12 through the communication bus 13. Note that since the respective mechanisms for generating an interrupt signal in each of the modules 11_1 to 11_n are fundamentally the same as each other, only the module 11_1 is explained hereinafter as a representative example.

The module 11_1 includes a communication circuit 111, a state determination circuit 112, and an interrupt signal generation circuit (first interrupt signal generation circuit) 113.

(Communication Circuit 111)

The communication circuit 111 performs data communication with the control device 12 through the communication bus 13. Further, the communication circuit 111 brings an interrupt instruction signal I1 into an active state (e.g., changes its level from an L-level to an H-level) when, for example, an abnormality occurs inside the module.

(State Determination Circuit 112)

The state determination circuit 112 determines whether or not the state of the communication bus 13 is an idle state or a busy state.

For example, when the state of the communication bus 13 is the idle state (the signals SDA and SCL are both at an H-level), the state determination circuit 112 outputs an L-level state signal S1. Further, when the communication bus 13 is in the busy state, the state determination circuit 112 outputs an H-level state signal S1.

Note that as described above, the start of a busy state, i.e., the change from an idle state to a busy state is triggered when the signal SDA falls while the signal SCL is at an H-level. Further, as described above, the stop of a busy state, i.e., the change from a busy state to an idle state is triggered when the signal SDA rises while the signal SCL is at an H-level. Therefore, upon detecting the start (or the stop) of a busy signal, the state determination circuit 112 changes the level of the state signal S1 from an L-level to an H-level (or from an H-level to an L-level).

(Specific Configuration Example of State Determination Circuit 112)

Figure 5:
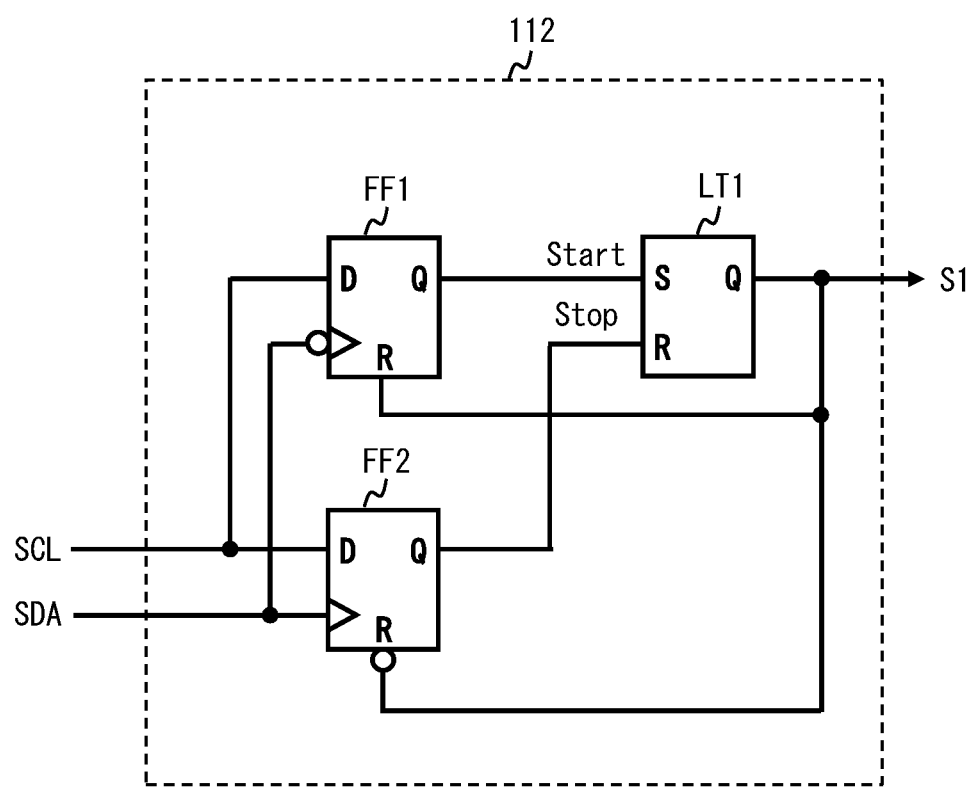
FIG. 5 is a circuit diagram showing a specific configuration example of a state determination circuit provided in the semiconductor system shown in FIG. 1.

FIG. 5 is a circuit diagram showing a specific configuration example of the state determination circuit 112.

As shown in FIG. 5, the state determination circuit 112 includes flip-flop circuits FF1 and FF2, and a latch circuit LT1.

The flip-flop circuit FF1 takes in the signal SCL in synchronization with a falling edge of the signal SDA and outputs the taken signal as a start signal. That is, the flip-flop circuit FF1 brings the start signal into an active state (H-level) when the signal SCL is at an H-level and the signal SDA falls, which is the condition for starting a busy state. Note that when the state signal S1 is at an H-level (i.e., the state signal S1 indicates a busy state), the flip-flop circuit FF1 initializes the start signal to an inactive state (L-level).

The flip-flop circuit FF2 takes in the signal SCL in synchronization with a rising edge of the signal SDA and outputs the taken signal as a stop signal. That is, the flip-flop circuit FF2 brings the stop signal into an active state (H-level) when the signal SCL is at an H-level and the signal SDA rises, which is the condition for stopping a busy state. Note that when the state signal S1 is at an L-level (i.e., the state signal S1 indicates an idle state), the flip-flop circuit FF2 initializes the stop signal to an inactive state (L-level).

The latch circuit LT1 outputs the state signal S1 from its output terminal Q based on the start signal input to its set terminal S and the stop signal input to its reset terminal R. Specifically, the latch circuit LT1 raises the state signal S1 in synchronization with an rising edge of the start signal (changes the state signal S1 from an idle state to a busy state) and brings down the state signal S1 in synchronization with an rising edge of the stop signal (changes the state signal S1 from the busy state to the idle state).

The configuration of the state determination circuit 112 shown in FIG. 5 is a mere example. That is, the configuration of the state determination circuit 112 may be changed as appropriate to other configurations having equivalent functions.

(Interrupt Signal Generation Circuit 113)

The interrupt signal generation circuit 113 generates an interrupt signal that is defined by using a bus potential undefined in the data communication standard when the interrupt signal generation circuit 113 receives an interrupt instruction from the communication circuit 111, i.e., when the state of the interrupt instruction signal I1 output from the communication circuit 111 becomes an active state. Further, the interrupt signal generation circuit 113 outputs the generated interrupt signal to the communication bus 13.

It should be noted that in the idle state, only the bus potential where the signal SDA falls while the signal SCL is at an H-level is defined and this bus potential indicates a change to a busy state. For example, a bus potential where the signal SCL falls while the signal SDA is at an H-level is not defined.

Further, in the busy state, the signal SDA usually does not change when the signal SCL is at an H-level. Therefore, a bus potential where both of the signals SCL and SDA are originally at an H-level and the signal SDA changes from the H-level to an L-level before the signal SCL changes to an L-level is not defined.

Further, in the busy state, a bus potential where the signal SDA changes twice or more while the signal SCL remains unchanged at an L-level is also not defined. For example, a bus potential where the signal SCL is originally at an L-level, and the signal SDA changes from an L-level to an H-level and then changes to an L-level again before the signal SCL changes to an H-level is not defined.

Therefore, in the semiconductor system 1, the above-described undefined bus potentials are newly defined as interrupt signals.

Figure 6:
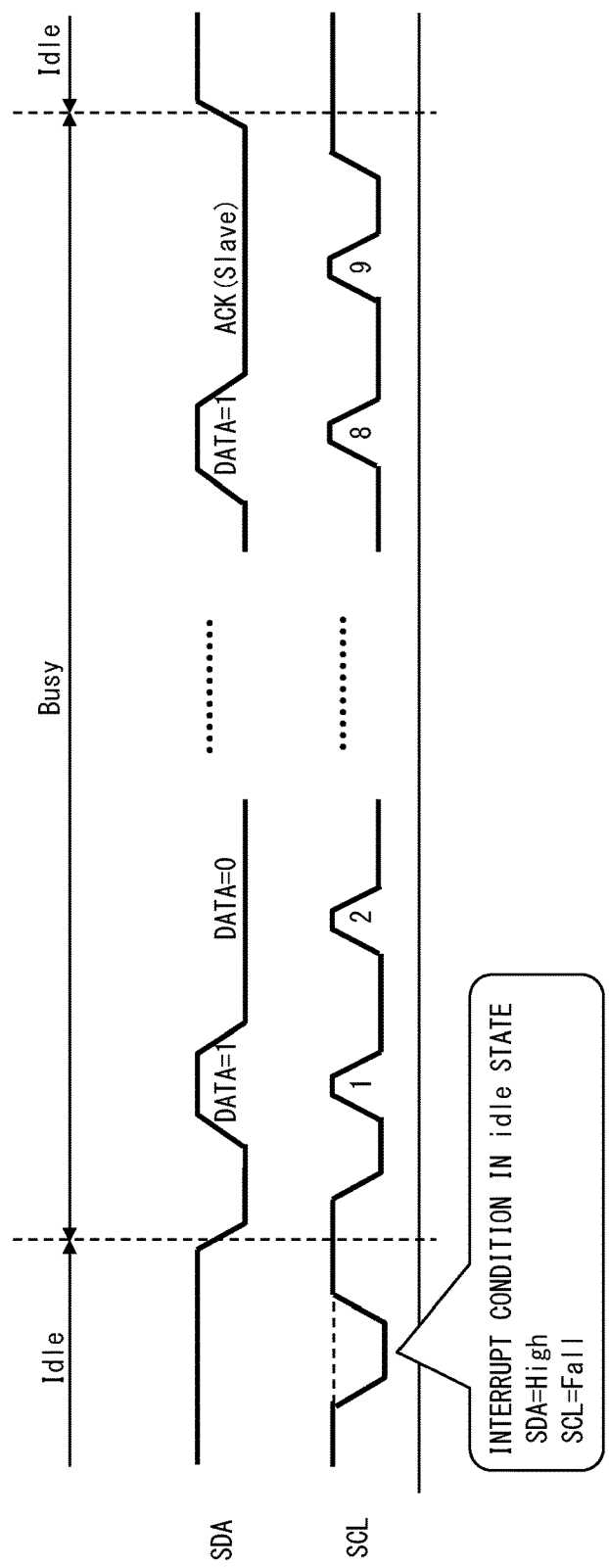
FIG. 6 is a timing chart showing an example of an interrupt signal defined in the semiconductor system shown in FIG. 1.
Figure 7:
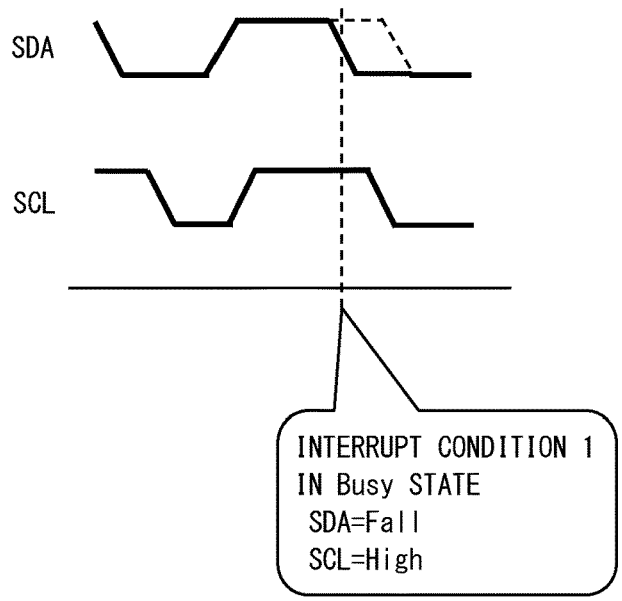
FIG. 7 is a timing chart showing an example of an interrupt signal defined in the semiconductor system shown in FIG. 1.
Figure 8:
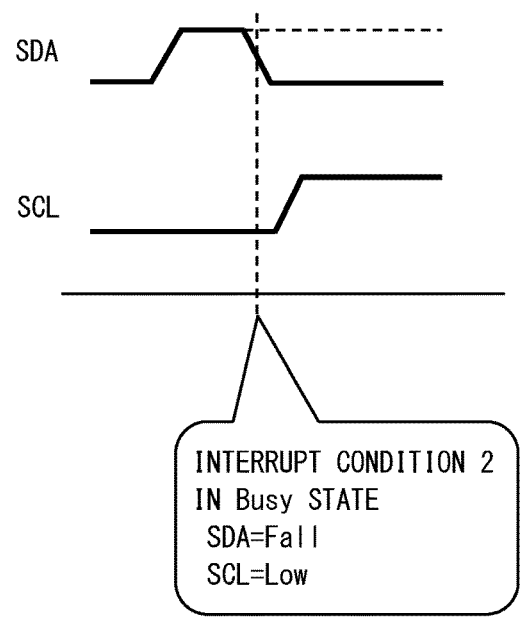
FIG. 8 is a timing chart showing an example of an interrupt signal defined in the semiconductor system shown in FIG. 1.

Specifically, as shown in FIG. 6, in the idle state, the interrupt signal generation circuit 113 generates an interrupt signal by changing the signal SCL from an H-level to an L-level while maintaining the signal SDA at an H-level (ST1->ST8 in FIG. 4). Further, as shown in FIG. 7, in the busy state, the interrupt signal generation circuit 113 generates an interrupt signal by, when both of the signals SCL and SDA are at an H-level, changing the signal SDA from the H-level to an L-level before the signal SCL changes to an L-level (ST6->ST8 in FIG. 4). Further, as shown in FIG. 8, in the busy state, the interrupt signal generation circuit 113 generates an interrupt signal by, when the signal SDA changes from an L-level to an H-level while the signal SCL remains at an L-level, changing the signal SDA to an L-level again before the signal SCL changes to an H-level (ST4->ST8 in FIG. 4).

(Specific Configuration Example of Interrupt Signal Generation Circuit 113)

Figure 9:
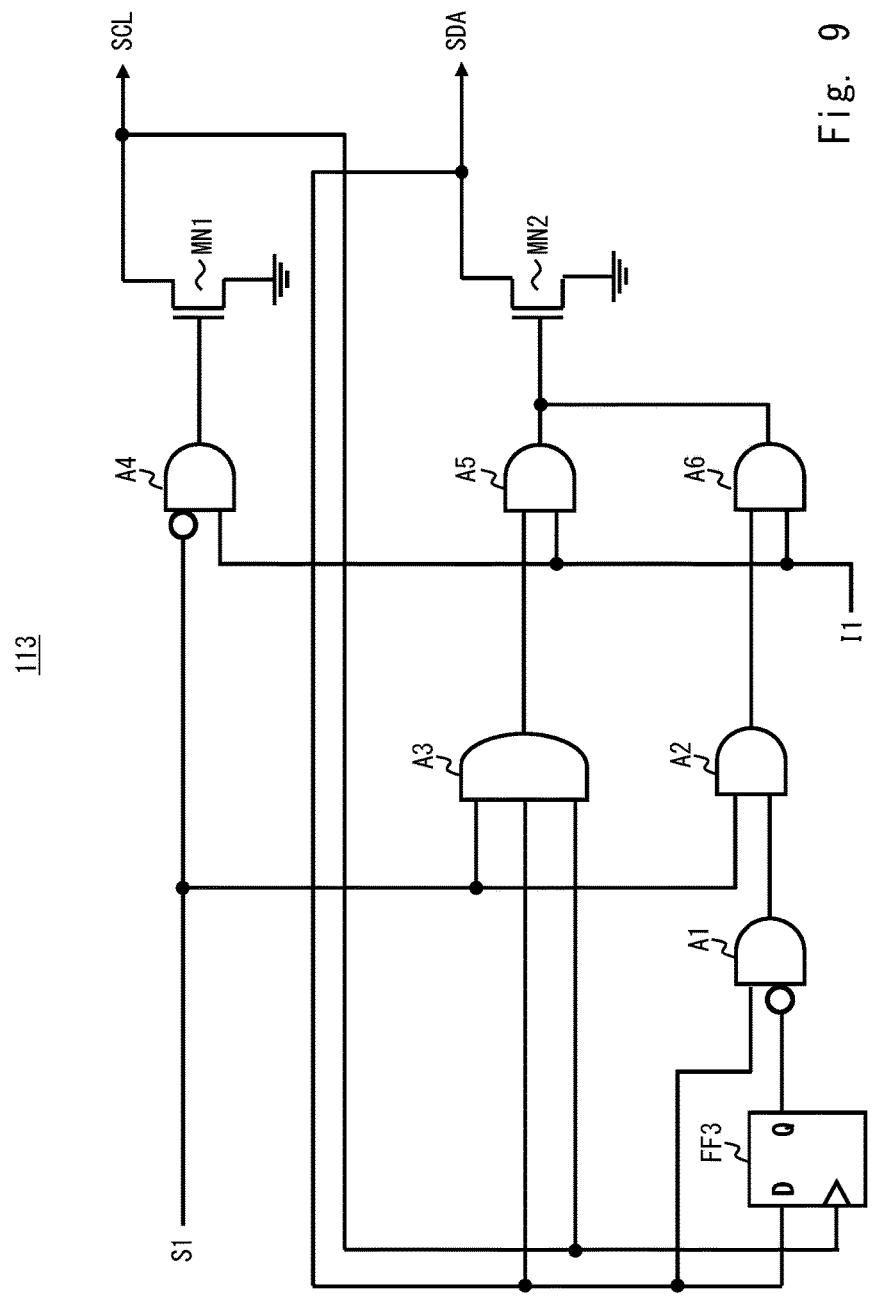
FIG. 9 is a circuit diagram showing a specific configuration example of an interrupt signal generation circuit provided in the semiconductor system shown in FIG. 1.

FIG. 9 is a circuit diagram showing a specific configuration example of the interrupt signal generation circuit 113.

As shown in FIG. 9, the interrupt signal generation circuit 113 includes a flip-flop circuit FF3, logical multiplication circuits (hereinafter referred to as "AND circuits") A1 to A6, and transistors MN1 and MN2. Each of the transistors MN1 and MN2 is an N-channel MOS transistor.

The AND circuit A4 outputs the logical multiplication of an inverted signal of the state signal S1 and the interrupt instruction signal I1. The AND circuit A3 outputs the logical multiplication of the state signal S1, the signal SCL, and the signal SDA. The AND circuit A5 outputs the logical multiplication of the output of the AND circuit A3 and the interrupt instruction signal I1. The flip-flop circuit FF3 takes in the signal SDA in synchronization with a rising edge of the signal SCL and outputs the taken signal. The AND circuit A1 outputs the logical multiplication of the signal SDA and an inverted signal of the output of the flip-flop circuit FF3. The AND circuit A2 outputs the logical multiplication of the state signal S1 and the output of the AND circuit A1. The AND circuit A6 outputs the logical multiplication of the output of the AND circuit A2 and the interrupt instruction signal I1.

The source of the transistor MN1 is connected to a ground voltage terminal GND and the drain is connected to the signal line SCL. Further, the output of the AND circuit A4 is supplied to the gate of the transistor MN1. The source of the transistor MN2 is connected to the ground voltage terminal GND and the drain is connected to the signal line SDA. Further, the outputs of the AND circuits A5 and A6 are both supplied to the gate of the transistor MN2.

For example, when the interrupt instruction signal I1 is in an inactive state (L-level) in an idle state, the outputs of all the AND circuits A4 to A6 become an L-level. Therefore, the transistors MN1 and MN2 are both turned off. Therefore, both of the signals SDA and SCL remain at the H-level.

On the other hand, when the interrupt instruction signal I1 is in an active state (H-level) in an idle state, the output of the AND circuit A4 becomes an H-level since the state signal S1 is in the L-level. Further, the outputs of the AND circuits A5 and A6 remain at the L-level. Therefore, the transistor MN1 is turned on and the transistor MN2 remains in the off-state. As a result, the signal SDA is fixed at the H-level and the signal SCL changes from the H-level to an L-level. That is, an interrupt signal is output from the interrupt signal generation circuit 113.

Further, when the interrupt instruction signal I1 is in an inactive state (L-level) in a busy state, the outputs of all the AND circuits A4 to A6 become an L-level. Therefore, the transistors MN1 and MN2 are both turned off. Therefore, the signals SDA and SCL indicate values according to the data and the clock, respectively.

On the other hand, when the interrupt instruction signal I1 is in an active state (H-level) in a busy state, the output of the AND circuit A4 remains at the L-level since the state signal S1 is in the H-level. Therefore, since the transistor MN1 remains in the off-state, the signal SCL indicates a value according to the clock. Note that when both of the signals SCL and SDA are at an H-level, the output of the AND circuit A3 becomes an H-level and the output of the AND circuit A5 becomes an H-level. Therefore, the transistor MN2 is turned on. As a result, the signal SDA changes from the H-level to an L-level (before the signal SCL changes to an L-level). That is, an interrupt signal is output from the interrupt signal generation circuit 113. Further, when the signal SDA changes from the L-level to an H-level while the signal SCL remains at the L-level, the output of the AND circuit A2 becomes an H-level and the output of the AND circuit A6 becomes an H-level. Therefore, the transistor MN2 is turned on. As a result, the signal SDA changes to an L-level again (before the signal SCL changes to an L-level). That is, an interrupt signal is output from the interrupt signal generation circuit 113.

The configuration of the interrupt signal generation circuit 113 shown in FIG. 9 is a mere example. That is, the configuration of the interrupt signal generation circuit 113 may be changed as appropriate to other configurations having equivalent functions.

(Control Device 12)

Next, the control device 12 is explained.

The control device 12 is formed by one chip or a plurality of chips, and includes a control circuit 121, a state determination circuit 122, and an interrupt signal detection circuit (second interrupt signal detection circuit) 124.

The control circuit 121 is, for example, a microcomputer and performs data communication with the modules 11_1 to 11_n through the communication bus 13.

The state determination circuit 122 determines whether the state of the communication bus 13 is an idle state or a busy state and outputs the determination result as a state signal S. The configuration of the state determination circuit 122 is similar to that of the state determination circuit 112 and therefore its explanation is omitted. Note that since the switching between the idle state and the busy state is performed by the control circuit 121, the state signal S may be directly output from the control circuit 121, thus eliminating the need for the state determination circuit 122.

(Interrupt Signal Detection Circuit 124)

The interrupt signal detection circuit 124 is a circuit that detects an interrupt signal output from the modules 11_1 to 11_n to the communication bus 13.

For example, when the signal SCL falls while the signal SDA is at a H-level in an idle state, the interrupt signal detection circuit 124 determines that an interrupt signal is output from one of the modules 11_1 to 11_n and hence brings a detection result D into an active state (H-level). Further, when the signal SCL falls while the signal SDA is at a H-level in a busy state, or when the signal SDA changes twice while the signal SCL remains unchanged at an L-level, the interrupt signal detection circuit 124 determines that an interrupt signal has been output from one of the modules 11_1 to 11_n and hence brings the detection result D into an active state (H-level). Note that when the above-described interrupt signal is not output from any of the modules 11_1 to 11_n, the interrupt signal detection circuit 124 maintains the detection result D in an inactive state (L-level).

When an interrupt signal is detected by the interrupt signal detection circuit 124, the control circuit 121 performs, for example, a predetermined process such as a process for stopping the operations of the control device 12 and the modules 11_1 to 11_n. Note that when the predetermined process has been completed, the communication bus 13 is, for example, restored to the idle state, which is the initial state, by using a reset signal (ST8->ST1 in FIG. 4).

(Specific Configuration Example of Interrupt Signal Detection Circuit 124)

Figure 10:
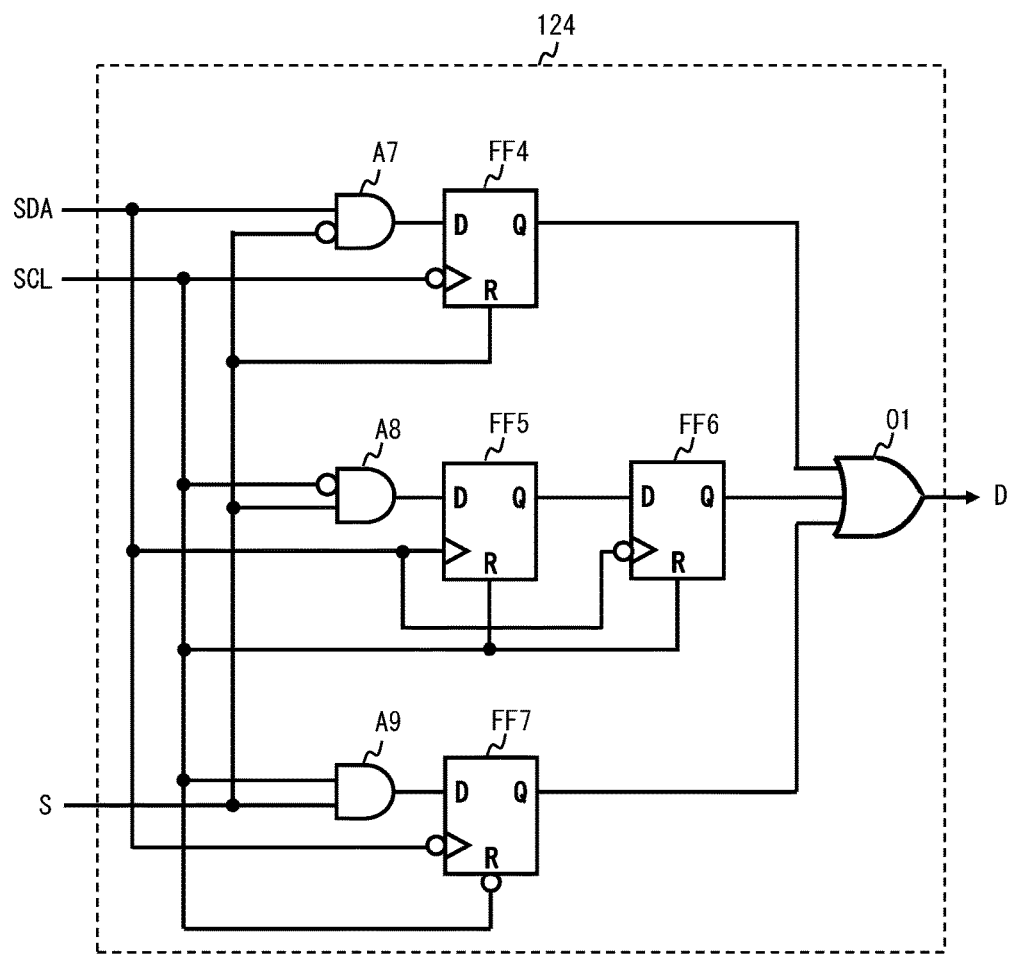
FIG. 10 is a circuit diagram showing a specific configuration example of an interrupt signal detection circuit provided in the semiconductor system shown in FIG. 1.

FIG. 10 is a circuit diagram showing a specific configuration example of the interrupt signal detection circuit 124.

As shown in FIG. 10, the interrupt signal detection circuit 124 includes AND circuits A7 to A9, flip-flop circuits FF4 to FF7, and a logical sum circuit (hereinafter referred to as an "OR circuit") O1.

The AND circuit A7 outputs a logical multiplication of the signal SDA and an inverted signal of the state signal S. The flip-flop circuit FF4 takes in the output of the AND circuit A7 in synchronization with a falling edge of the signal SCL and outputs the taken signal. Note that when the state signal S is at an H-level (i.e., the state signal S indicates a busy state), the flip-flop circuit FF4 initializes its outputs to an L-level.

The AND circuit A8 outputs the logical multiplication of an inverted signal of the signal SCL and the state signal S. The flip-flop circuit FF5 takes in the output of the AND circuit A8 in synchronization with a rising edge of the signal SDA and outputs the taken signal. Note that when the signal SCL is at an H-level, the flip-flop circuit FF5 initializes its outputs to an L-level. The flip-flop circuit FF6 takes in the output of the flip-flop circuit FF5 in synchronization with a falling edge of the signal SDA and outputs the taken signal. Note that when the signal SCL is at an H-level, the flip-flop circuit FF6 initializes its outputs to an L-level.

The AND circuit A9 outputs the logical multiplication of the signal SCL and the state signal S. The flip-flop circuit FF7 takes in the output of the AND circuit A9 in synchronization with a falling edge of the signal SDA and outputs the taken signal. Note that when the signal SCL is at an L-level, the flip-flop circuit FF7 initializes its outputs to an L-level.

The OR circuit O1 outputs the logical sum of the outputs of the flip-flop circuits FF4, FF6 and FF7 as a detection result D.

For example, when the signal SCL changes from an H-level to an L-level while the signal SDA is at a H-level in an idle state, the flip-flop circuit FF4 taken in the output of the AND circuit A7 in synchronization with a falling edge of the signal SCL and outputs the taken signal. Note that since the state signal S is at an L-level, indicating the idle state, the output of the AND circuit A7 has an H-level. Therefore, the flip-flop circuit FF4 outputs an H-level signal. Consequently, the OR circuit OR1 outputs an H-level detection result D. That is, an interrupt signal output from one of the modules 11_1 to 11_n is detected by the interrupt signal detection circuit 124.

Further, in a state where the signals SCL and SDA are both at an H-level in a busy state, when the signal SDA changes from the H-level to an L-level before the signal SCL changes to an L-level, the flip-flop circuit FF7 takes in the output of the AND circuit A9 in synchronization with a falling edge of the signal SDA and outputs the taken signal. Note that since the state signal S is at an H-level, indicating the busy state, the output of the AND circuit A9 has an H-level. Therefore, the flip-flop circuit FF7 outputs an H-level signal. Consequently, the OR circuit OR1 outputs an H-level detection result D. That is, an interrupt signal output from one of the modules 11_1 to 11_n is detected by the interrupt signal detection circuit 124.

Further, in a state where the signal SCL is at an L-level and the signal SDA has changed from an L-level to an H-level in a busy state, when the signal SDA changes to an L-level again before the signal SCL changes to an H-level, the flip-flop circuit FF5 takes in the output of the AND circuit A8 in synchronization with the rising edge (the first change) of the signal SDA and outputs the taken signal. Note that since the state signal S is at an H-level, indicating the busy state, the output of the AND circuit A8 has an H-level. Therefore, the flip-flop circuit FF5 outputs an H-level signal. After that, the flip-flop circuit FF6 takes in the H-level output of the flip-flop circuit FF5 in synchronization with the falling edge (the second change) of the signal SDA and outputs the taken signal. Consequently, the OR circuit OR1 outputs an H-level detection result D. That is, an interrupt signal output from one of the modules 11_1 to 11_n is detected by the interrupt signal detection circuit 124.

Note that when no interrupt signal is detected, the outputs of all the flip-flop circuits FF4, FF6 and FF7 are at an L-level. Therefore, the OR circuit O1 outputs an L-level detection result D.

The configuration of the interrupt signal detection circuit 124 shown in FIG. 10 is a mere example. That is, the configuration of the interrupt signal detection circuit 124 may be changed as appropriate to other configurations having equivalent functions.

As described above, in the semiconductor system 1 according to this embodiment, when an abnormality occurs in a given module, that module itself generates an interrupt signal that is newly defined by using a bus potential undefined in the data communication standard, and outputs the generated interrupt signal to the control device 12. As a result, in the semiconductor system 1, the module can notify the control device 12 of the interrupt signal even when the semiconductor system 1 is in an idle state where no communication is performed, thus making it possible to swiftly perform a process corresponding to the interrupt signal such as a process for stopping the operation of the entire system. Further, this configuration does not increase the number of signal lines.

Note that the interrupt signal may include additional information added thereto that is expressed by (the length of) the output period of the interrupt signal.

Figure 11:
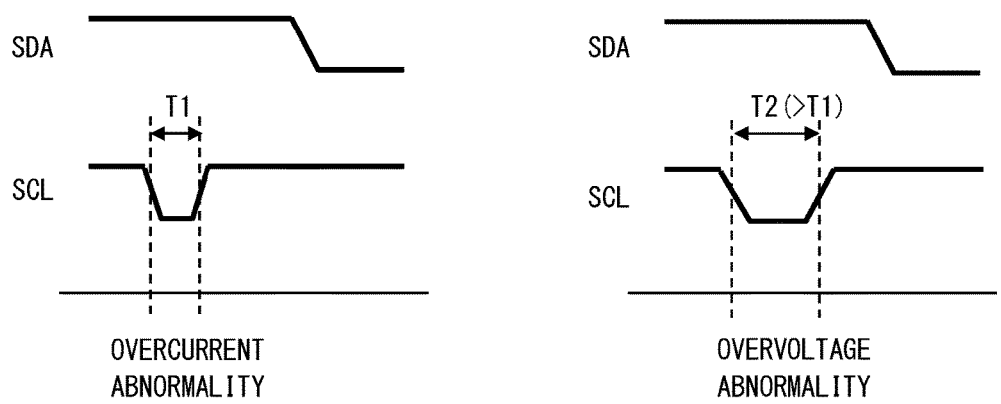
FIG. 11 is a timing chart showing a modified example of an interrupt signal defined in the semiconductor system shown in FIG. 1.

As shown in FIG. 11, for example, when the period from when the signal SCL falls to when the signal SCL rises (the output period of the interrupt signal) is equal to a predetermined period T1 in an idle state, it indicates that an overcurrent abnormality has occurred in the module or the control device that has output the interrupt signal. Further, when the output period of the interrupt signal is equal to a predetermined period T2 (>T1), it indicates that an overvoltage abnormality has occurred in the module or the control device that has output the interrupt signal. Note that the interrupt signal may include additional information about the place (address) where the abnormality has occurred or the like in addition or instead of the information about the overcurrent abnormality or the overvoltage abnormality. This additional information may be output from the communication circuit 111 or may be output from a separately-provided control circuit or the like.

Further, the interrupt signal may include additional information added thereto that is expressed by the voltage level of the interrupt signal.

Figure 12:
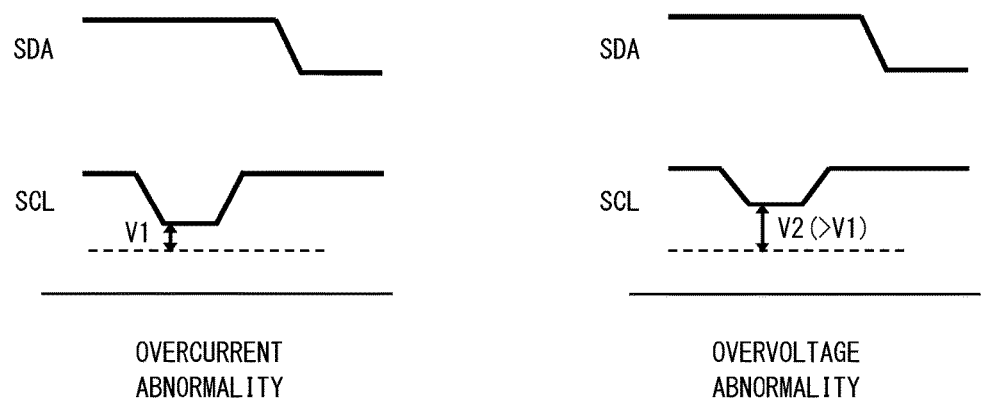
FIG. 12 is a timing chart showing a modified example of an interrupt signal defined in the semiconductor system shown in FIG. 1.

As shown in FIG. 12, for example, when the voltage level after the signal SCL falls is equal to a predetermined value V1 in an idle state, it indicates that an overcurrent abnormality has occurred in the module or the control device that has output the interrupt signal. Further, when the voltage level after the signal SCL falls is equal to a predetermined value V2 (>V1) in an idle state, it indicates that an overvoltage abnormality has occurred in the module or the control device that has output the interrupt signal. Note that the interrupt signal may include additional information about the place (address) where the abnormality has occurred or the like in addition or instead of the information about the overcurrent abnormality or the overvoltage abnormality. This additional information may be output from the communication circuit 111 or may be output from a separately-provided control circuit or the like.

Figure 13:
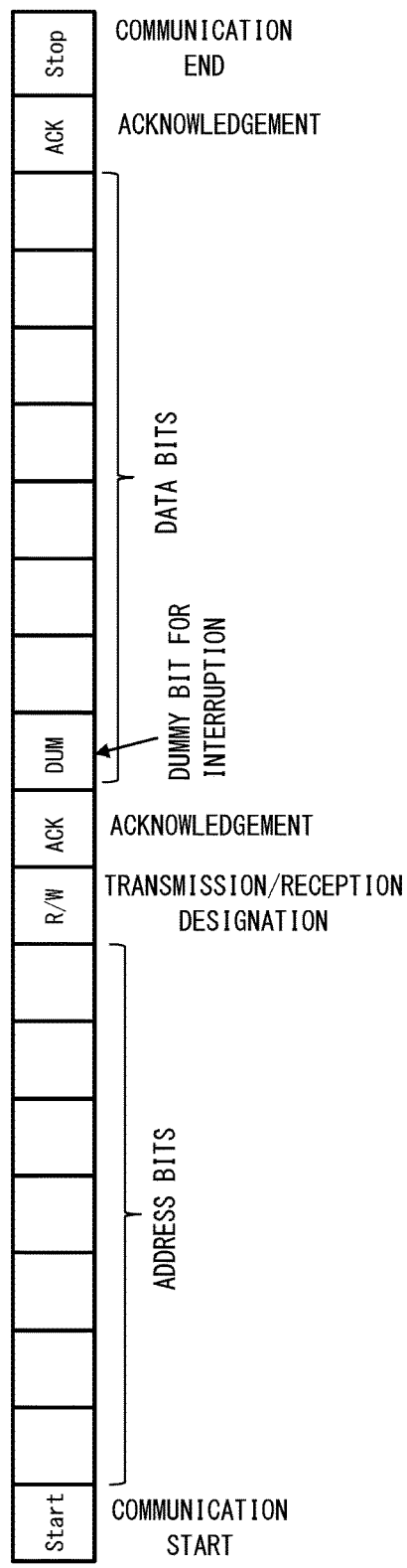
FIG. 13 is a modified example of a data set used in data communication performed by the semiconductor system shown in FIG. 1.

Note that when the signal SDA is at an L-level in a busy state, it is impossible to generate an interrupt signal. Therefore, for example, there is a possibility that when the control device 12 continuously outputs L-level data, the notification of an interrupt signal from the modules 11_1 to 11_n could be delayed. To cope with this, as shown in FIG. 13, it is possible to create a state where an interrupt signal can be generated by using (or defining) a predetermined bit in data (the most significant bit among a plurality of bits constituting data in this example) as a dummy bit and fixing the dummy bit to an H-level.

(Modified Example of Semiconductor System 1)

Figure 14:
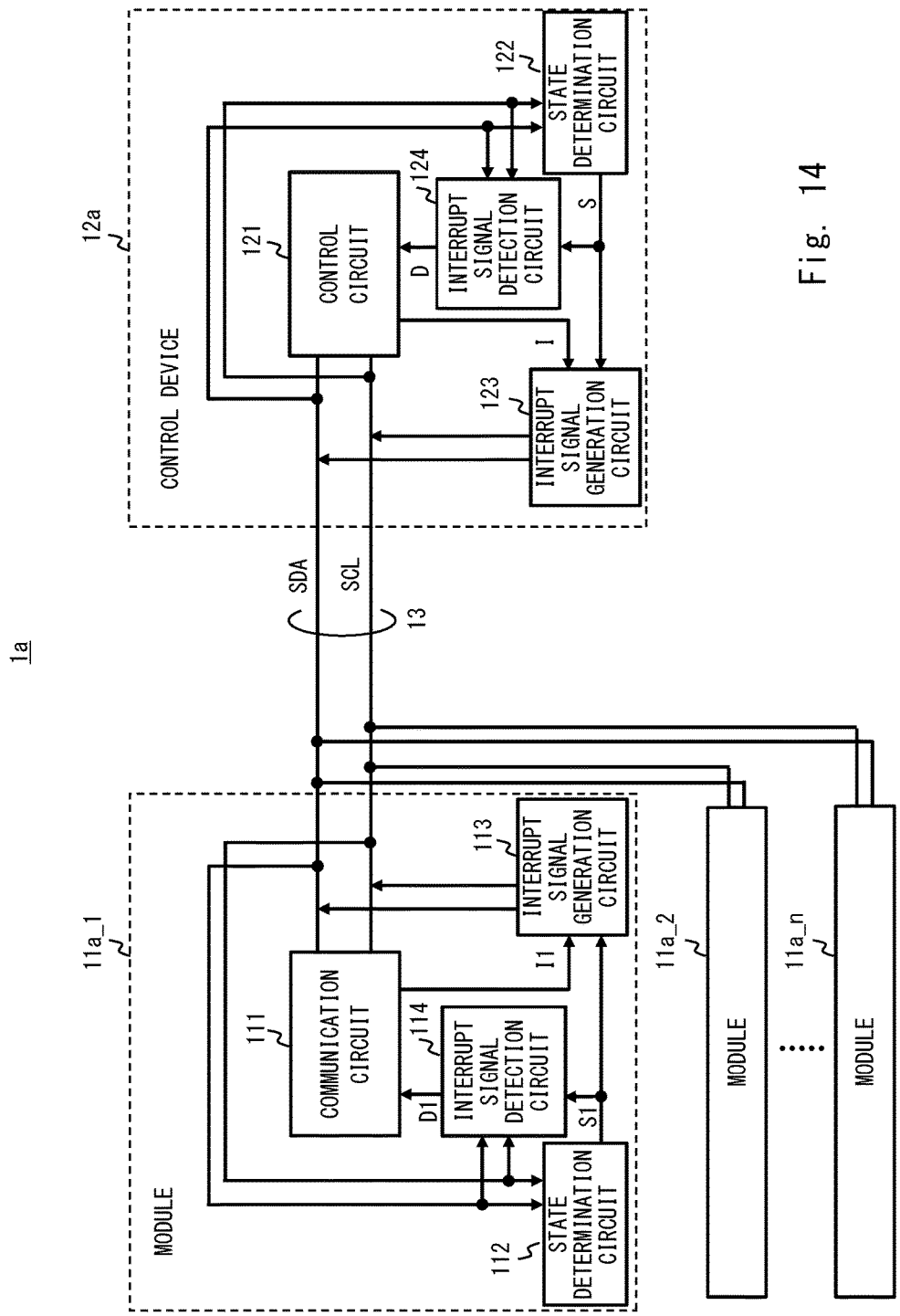
FIG. 14 shows a modified example of the semiconductor system shown in FIG. 1.

FIG. 14 shows a semiconductor system 1a which is a modified example of the semiconductor system 1. When compared to the semiconductor system 1, the semiconductor system 1a includes modules 11a_1 to 11a_n, which are modified examples of the modules 11_1 to 11_n, and a control device 12a, which is a modified example of the control device 12.

Each of the modules 11a_1 to 11a_n further includes an interrupt signal detection circuit (first interrupt signal detection circuit) 114, and the control device 12a further includes an interrupt signal generation circuit (second interrupt signal generation circuit) 123. Note that since the respective mechanisms for detecting an interrupt signal in each of the modules 11a_1 to 11a_n are fundamentally the same as each other, only the module 11a_1 is explained hereinafter as a representative example.

The interrupt signal detection circuit 114, which is additionally provided in the module 11a_1, has a configuration equivalent to that of the interrupt signal detection circuit 124 in the control device 12. The interrupt signal detection circuit 114 detects an interrupt signal from the other modules 11a_2 to 11a_n or the control device 12a and outputs a detection result Dl. When the interrupt signal is detected by the interrupt signal detection circuit 114, the communication circuit 111 performs, for example, a predetermined process such as a process for stopping the operation of its own module 11a_1.

The interrupt signal generation circuit 123, which is additionally provided in the control device 12a, has a configuration equivalent to that of the interrupt signal generation circuit 113 in the module 11a_1. The interrupt signal generation circuit 123 generates an interrupt signal when an abnormality occurs in the control circuit 121 and outputs the generated interrupt signal to the communication bus 13.

The other configuration of the semiconductor system 1a is similar to that of the semiconductor system 1 and therefore its explanation is omitted.

In the semiconductor system 1a, each of the modules 11a_1 to 11a_n has a function of detecting an interrupt signal from the other ones of the modules 11a_1 to 11a_n and the control device 12a. Therefore, each of the modules 11a_1 to 11a_n is able to swiftly perform a predetermined process corresponding to the interrupt signal without waiting for an instruction, such as an operation stop instruction, sent from the control device 12.

Second Embodiment

Figure 15:
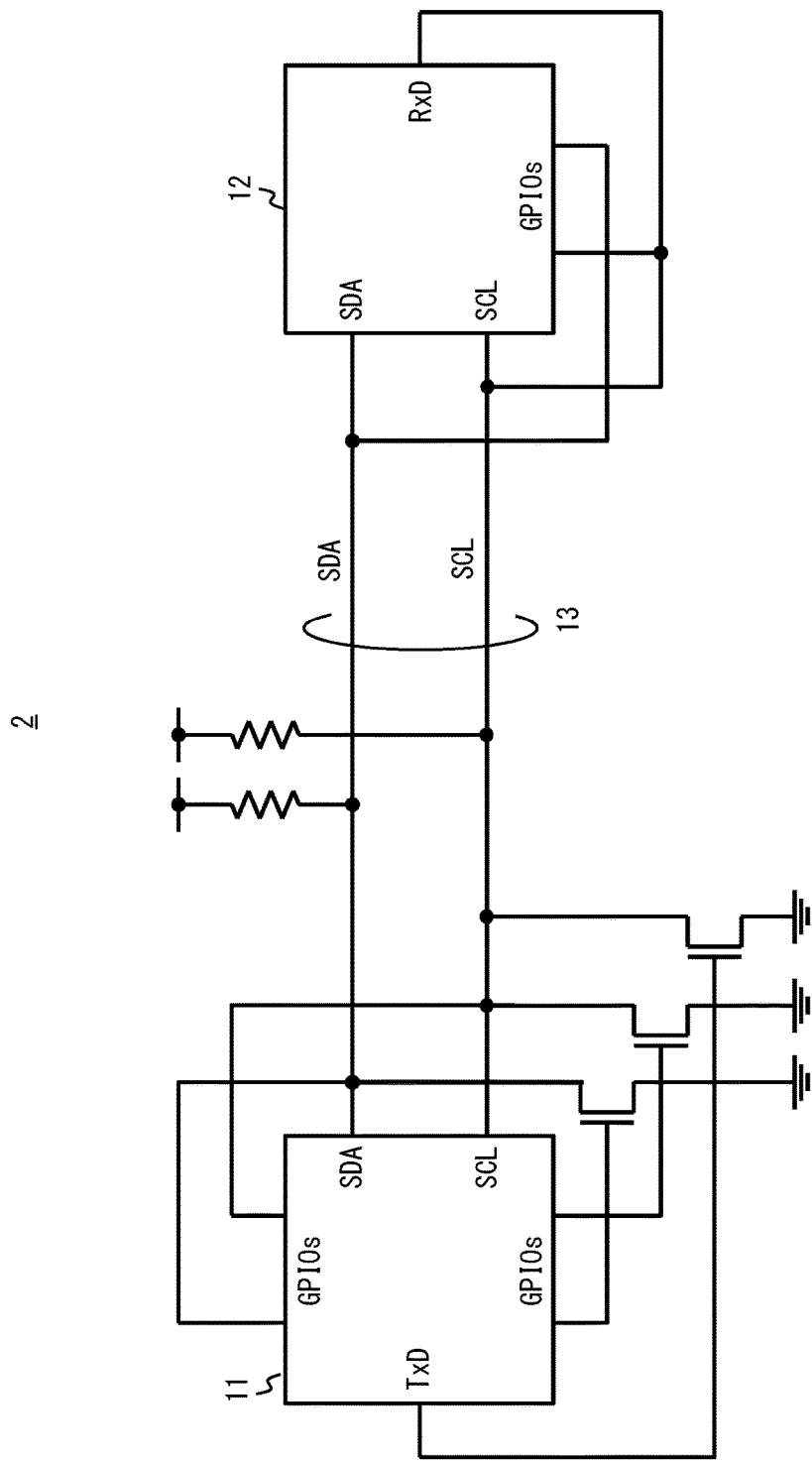
FIG. 15 shows a configuration example of a semiconductor system according to a second embodiment.

FIG. 15 shows a configuration example of a semiconductor system 2 according to a second embodiment. Note that only the module 11_1 among the modules 11_1 to 11_n is shown in FIG. 15.

The module 11_1 includes a serial communication device such as an UART (Universal Asynchronous Receiver Transmitter) (not shown) and outputs, following the interrupt signal, additional information provided from the UART to the communication bus 13 (through a terminal TxD, GPIO, or the like). The additional information is, for example, the details of an abnormality and/or the place (address) of an abnormality. Note that this additional information may be directly output from the communication circuit 111 instead of being output from the separately-provided serial communication device.

When the control device 12 detects an interrupt signal, the control device 12 changes a reception mode and receives additional information (through the terminal TxD, GPIO, or the like), which is sent subsequently to the interrupt signal. As a result, the control device 12 can recognize the details of the abnormality and/or the place of the abnormality of the module 11_1, thus making it possible to perform elaborate control according to the abnormality details and/or the abnormality place in addition to or instead of stopping the operation of the entire system.

Although this embodiment has been explained by using an example case where the module 11_1 sends additional information provided from the UART subsequently to the interrupt signal, the present invention is not limited to such a case. Needless to say, each of the other modules 11_2 to 11_n can also be configured so that it sends additional information provided from the UART subsequently to the interrupt signal.

Third Embodiment

Figure 16:
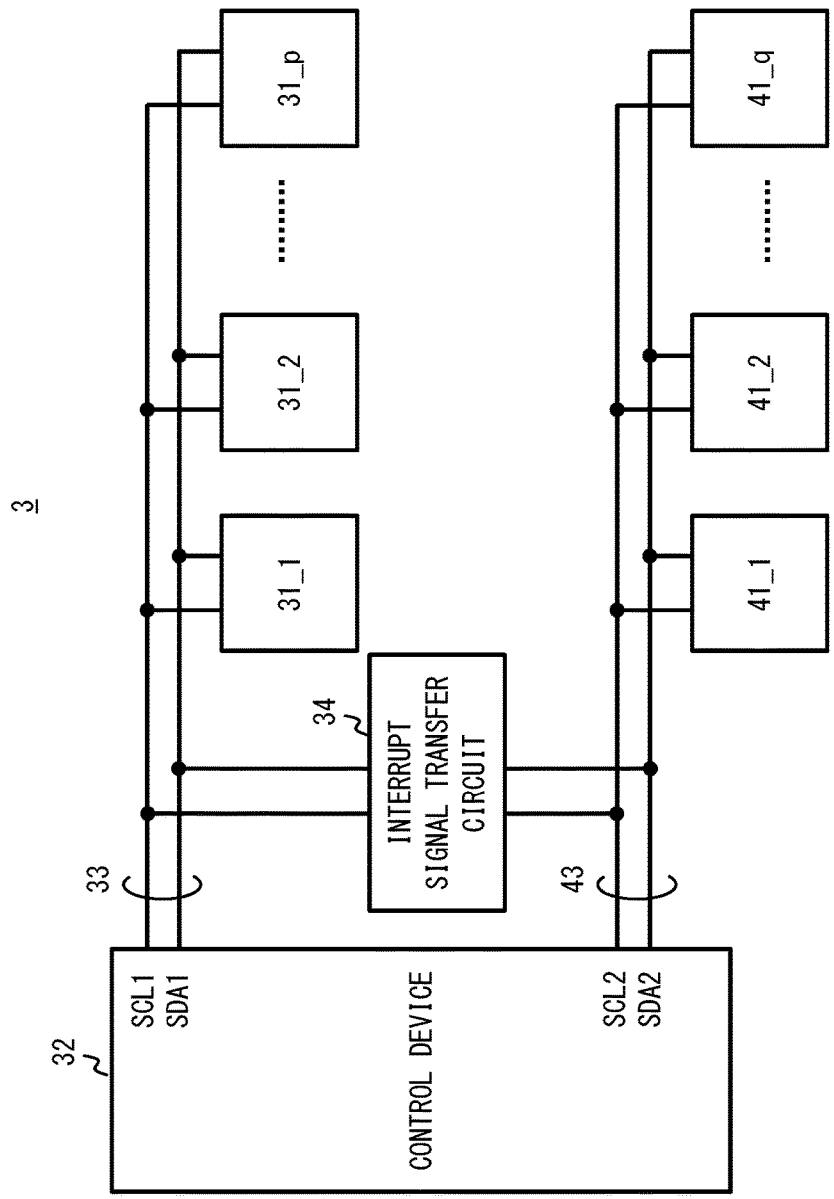
FIG. 16 shows a configuration example of a semiconductor system according to a third embodiment.

FIG. 16 shows a configuration example of a semiconductor system 3 according to a third embodiment.

As shown in FIG. 16, the semiconductor system 3 includes modules 31_1 to 31_p (p is a natural number), modules 41_1 to 41_q (q is a natural number), a control device 32, a communication bus 33 that connects the modules 31_1 to 31_p with the control device 32, a communication bus 43 that connects the modules 41_1 to 41_q with the control device 32, and an interrupt signal transfer circuit 34.

The control device 32 has a function equivalent to that of the control device 12a for each of the communication buss 33 and 43. Further, each of the modules 31_1 to 31_p and 41_1 to 41_q has a function equivalent to that of the module 11_1. Data communication performed between the control device 32 and the modules 31_1 to 31_p is performed through the communication bus 33. Data communication performed between the control device 32 and the modules 41_1 to 41_q is performed through the communication bus 43, which is different from the communication bus 33.

The interrupt signal transfer circuit 34 is a circuit that transfers an interrupt signal on the communication bus 33 to the communication bus 43 and transfers an interrupt signal on the communication bus 43 to the communication bus 33.

For example, when one of the modules 31_1 to 31_p, which are connected to the communication bus 33, outputs an interrupt signal, that interrupt signal is transferred not only to the modules 31_1 to 31_p but also to the modules 41_1 to 41_q through the communication bus 33, the interrupt signal transfer circuit 34, and the communication bus 43. Further, when one of the modules 41_1 to 41_q, which are connected to the communication bus 43, outputs an interrupt signal, that interrupt signal is transferred not only to the modules 41_1 to 41_q but also to the modules 31_1 to 31_p through the communication bus 43, the interrupt signal transfer circuit 34, and the communication bus 33.

(Specific Configuration Example of Interrupt Signal Transfer Circuit 34)

Figure 17:
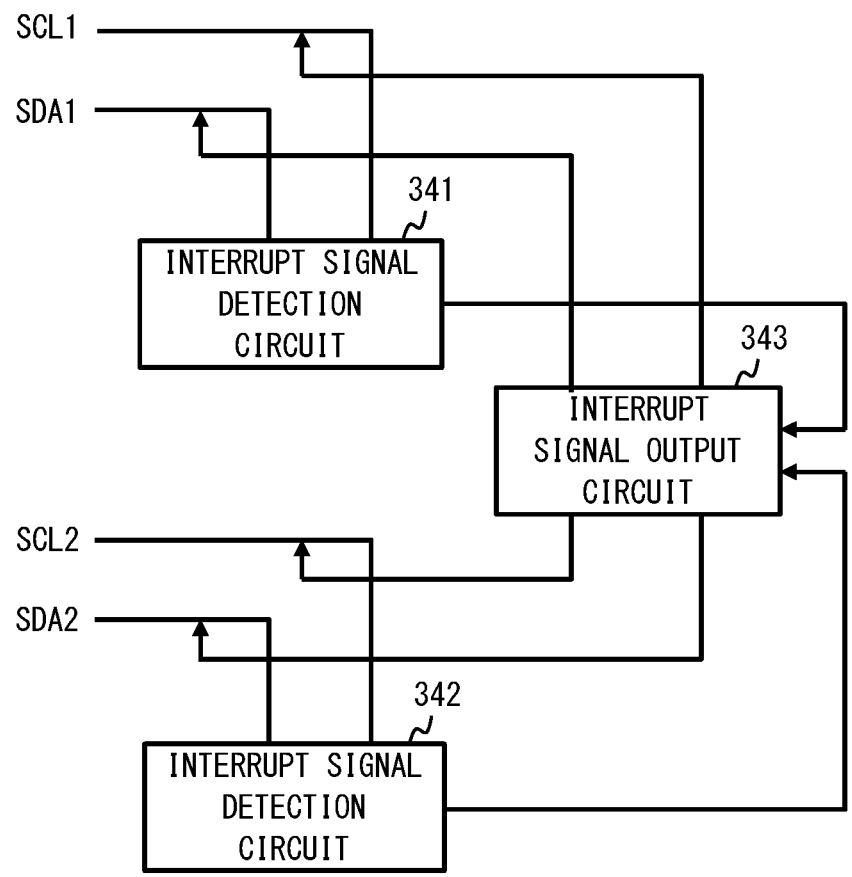
FIG. 17 is a block diagram showing a configuration example of an interrupt signal transmission circuit provided in the semiconductor system shown in FIG. 16.

FIG. 17 is a circuit diagram showing a specific configuration example of the interrupt signal transfer circuit 34.

As shown in FIG. 17, the interrupt signal transfer circuit 34 includes interrupt signal detection circuits 341 and 342, and an interrupt signal output circuit 343.

The interrupt signal detection circuit 341 has a configuration similar to those of the interrupt signal detection circuits 114 and 124, and detects an interrupt signal output from the modules 31_1 to 31_p based on the bus potential of the communication bus 33 (the signal levels of signal lines SDA1 and SCL1).

The interrupt signal detection circuit 342 has a configuration similar to those of the interrupt signal detection circuits 114 and 124, and detects an interrupt signal output from the modules 41_1 to 41_q based on the bus potential of the communication bus 43 (the signal levels of signal lines SDA2 and SCL2).

When an interrupt signal on the communication bus 33 is detected by the interrupt signal detection circuit 341, the interrupt signal output circuit 343 outputs the interrupt signal to the communication bus 43. Further, when an interrupt signal on the communication bus 43 is detected by the interrupt signal detection circuit 342, the interrupt signal output circuit 343 outputs the interrupt signal to the communication bus 33.

The configuration of the interrupt signal transfer circuit 34 shown in FIG. 17 is a mere example. That is, the configuration of the interrupt signal transfer circuit 34 may be changed as appropriate to other configurations having equivalent functions.

As described above, by providing the interrupt signal transfer circuit 34 between the communication buses 33 and 43, the semiconductor system 3 can swiftly send an interrupt signal output from a given module not only to other modules connected to the same communication bus (i.e., the communication bus to which the given module is connected) but also to modules connected to a different communication bus.

Although this embodiment has been explained by using an example case where the number of communication buses is two, the present invention is not limited to such a case. The number of communication buses may be three or more.

Further, although this embodiment has been explained by using an example case where the data communication methods for the communication buses 33 and 43 are both the I2C method, the present invention is not limited to such a case. The data communication methods for the communication buses 33 and 43 may be a communication method other than the I2C method. Further, mutually different communication methods may be used for the communication buses 33 and 43.

As described above, in the above-described semiconductor systems according to the first to third embodiments, when an abnormality occurs in a given module, that module itself generates an interrupt signal that is newly defined by using a bus potential undefined in the data communication standard, and outputs the generated interrupt signal to the control device. As a result, in the above-described semiconductor systems according to the first to third embodiments, the module can notify the control device or other modules of the interrupt signal even when the semiconductor system 1 is in an idle state, thus making it possible to swiftly perform a process corresponding to the interrupt signal such as a process for stopping the operation of the entire system. Further, this configuration does not increase the number of signal lines.

The present invention made by the inventors has been explained above in a specific manner based on embodiments. However, the present invention is not limited to the above-described embodiments, and needless to say, various modifications can be made without departing from the spirit and scope of the present invention.

For example, for each module, the functions of the interrupt signal generation circuit 113, the interrupt signal detection circuit 114, and so on can be implemented by executing an operation program in accordance with the state transition diagram shown in FIG. 4 by using a controller such as a microcomputer having an edge detection function in which signal lines SDA and SCL are connected to general-purpose IO terminals.

Further, for example, the semiconductor device according to the above-described embodiment may have a configuration in which the conductivity type (p-type or n-type) of the semiconductor substrate, the semiconductor layer, the diffusion layer (diffusion region), and so on may be reversed. Therefore, when one of the n-type and p-type is defined as a first conductivity type and the other is defined as a second conductivity type, the first and second conductivity types may be the p-type and n-type, respectively. Alternatively, the first and second conductivity types may be the n-type and p-type, respectively.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a communication circuit that performs data communication with an externally-provided control device through a bus, the bus communication being in accordance with a predefined data communications standard; and
a first interrupt signal generation circuit that, upon receiving an interrupt instruction from the communication circuit, generates an interrupt signal and outputs the generated interrupt signal to the bus, the interrupt signal being defined by using at least one bus potential undefined in the data communication standard and such that a communication of the interrupt signal onto the bus occurs regardless of whether the bus is currently idle or busy.

2. The semiconductor device according to claim 1, further comprising a first interrupt signal detection circuit that detects the interrupt signal externally-supplied through the bus, wherein
when the interrupt signal is detected by the first interrupt signal detection circuit, the communication circuit performs a predetermined process corresponding to the interrupt signal.

3. A semiconductor system comprising:
a first semiconductor device, the first semiconductor device being at least one semiconductor device according to claim 2;
at least one second semiconductor device different from the first semiconductor device;
the control device;
a first bus that connects the control device with the at least one first semiconductor device;
a second bus that connects the control device with the at least one second semiconductor device; and
an interrupt signal transfer circuit disposed between the first and second buses, the interrupt signal transfer circuit being configured to transfer the interrupt signal output to the first bus to the second bus and transfer the interrupt signal output to the second bus to the first bus.

4. The semiconductor device according to claim 2, wherein the predetermined process corresponding to the interrupt signal permits the semiconductor device to perform the predetermined process without further delay and without further instruction received on the bus.

5. The semiconductor device according to claim 2, wherein the predetermined process corresponding to the interrupt signal permits detection of an abnormality in any module connected to the bus and permits an entire system interconnected by the bus to stop operation without delay.

6. A semiconductor system comprising:
at least one semiconductor device according to claim 1;
the control device; and
the bus that connects the control device with the at least one semiconductor device, wherein
the control device comprises:
a second interrupt signal detection circuit that detects the interrupt signal output from the at least one semiconductor device; and
a control circuit that performs data communication with the at least one semiconductor device through the bus and, when the interrupt signal is detected by the second interrupt signal detection circuit, performs a predetermined process corresponding to the interrupt signal.

7. A semiconductor system comprising:
at least one semiconductor device according to claim 1;
the control device; and
the bus that connects the control device with the at least one semiconductor device, wherein
the control device comprises:
a second interrupt signal detection circuit that detects the interrupt signal output from the at least one semiconductor device;
a control circuit that performs data communication with the at least one semiconductor device through the bus and, when the interrupt signal is detected by the second interrupt signal detection circuit, performs a predetermined process corresponding to the interrupt signal; and
a second interrupt signal generation circuit that, upon receiving an interrupt instruction from the control circuit, generates the interrupt signal and outputs the generated interrupt signal to the bus.

8. The semiconductor device according to claim 1, further comprising a state determination circuit that determines whether a state of the bus is an idle state or a busy state, wherein
when the state of the bus is determined to be the idle state by the state determination circuit, the first interrupt signal generation circuit generates the interrupt signal by maintaining a data signal line of the bus at an H-level and changing a clock signal line of the bus from an H-level to an L-level.

9. The semiconductor device according to claim 1, further comprising a state determination circuit that determines whether a state of the bus is an idle state or a busy state, wherein
when the state of the bus is determined to be the busy state by the state determination circuit and a clock signal line and a data signal line of the bus are both at an H-level, the first interrupt signal generation circuit generates the interrupt signal by changing the data signal line from the H-level to an L-level before the clock signal line changes to an L-level.

10. The semiconductor device according to claim 1, further comprising a state determination circuit that determines whether a state of the bus is an idle state or a busy state, wherein
when the state of the bus is determined to be the busy state by the state determination circuit and a data signal line of the bus changes from an L-level to an H-level while a clock signal line of the bus remains at an L-level, the first interrupt signal generation circuit generates the interrupt signal by changing the data signal line to an L-level again before the clock signal line changes to an H-level.

11. The semiconductor device according to claim 1, wherein a predetermined bit of data propagating through a data signal line of the bus is fixed to an H-level.

12. The semiconductor device according to claim 1, wherein additional information is subsequently output after the interrupt signal is output.

13. The semiconductor device according to claim 1, wherein additional information expressed by an output period of the interrupt signal or a voltage level of the interrupt signal is added to the interrupt signal and output together with the interrupt signal.

14. The semiconductor device according to claim 1, wherein the predefined data communications standard comprises an I2C data communications standard.

15. The semiconductor device according to claim 1, wherein the first interrupt signal generation circuit comprises:
   a first input providing bus status input information of whether the bus is currently idle or busy;
   a second input providing an instruction to generate an interrupt signal based on an occurrence of an abnormality;
   a plurality of transistors respectively connected to individual lines of the bus, each transistor configured to selectively provide a predetermined potential on its bus line; and
   control logic to control the plurality of transistors in a predetermined manner to selectively place the bus lines at predetermined potentials that are undefined in the data communication standard but that are interpreted as an interrupt signal by an interrupt signal detection circuit,
   wherein the control logic can selectively generate an interrupt signal in either an idle bus state or a busy bus state upon receipt of a request signal on the second input.

16. A control method of a semiconductor device comprising:
   performing, by using a communication circuit, data communication with an externally-provided control device through a bus, the data communication and bus being defined in a data communication standard; and
   generating, upon receiving an interrupt instruction from the communication circuit, an interrupt signal and outputting the generated interrupt signal to the bus, the interrupt signal being defined by using a plurality of bus potentials that are undefined in the data communication standard, the plurality of undefined bus potentials permitting a communication of the interrupt signal onto the bus regardless of whether the bus is currently idle or busy.

17. The control method of a semiconductor device according to claim 16, further comprising, when the interrupt signal externally-supplied through the bus is detected, making the communication circuit perform a predetermined process corresponding to the interrupt signal.

18. The semiconductor device according to claim 17, wherein the predetermined process corresponding to the interrupt signal comprises one of:
   stopping an operation of a module having incorporated therein the semiconductor device;
   changing a receive mode to receive additional information to recognize at least one of details of the abnormality and a location of the abnormality and perform control in accordance with the abnormality; and
   having received an interrupt on the bus, transferring the interrupt onto a second bus different from the bus on which it was received.

19. The semiconductor device according to claim 18, wherein the first interrupt signal generation circuit comprises:
   a first input providing bus status input information of whether the I2C bus is currently idle or busy;
   a second input providing an instruction to generate an interrupt signal based on an occurrence of an abnormality;
   a plurality of transistors respectively connected to individual lines of the bus, each transistor configured to selectively provide a ground potential on its bus line; and
   control logic to control the plurality of transistors in a predetermined manner to selectively place the bus lines at predetermined potentials that are undefined in the data communication standard but that are interpreted as an interrupt signal by an interrupt signal detection circuit,
   wherein the control logic can selectively generate an interrupt signal in either an idle bus state or a busy bus state upon receipt of a request signal on the second input.

20. A semiconductor device including an interrupt signal generation circuit to generate an interrupt signal on a bus defined in accordance with a predetermined data communications standard, the interrupt signal generation circuit comprising:
   a first input providing bus status input information of whether the bus is currently idle or busy;
   a second input providing an instruction to generate an interrupt signal based on an occurrence of an abnormality;
   a plurality of transistors respectively connected to individual lines of the bus, each transistor configured to selectively provide a predetermined potential on its bus line; and
   control logic to control the plurality of transistors in a predetermined manner to selectively place the bus lines at predetermined potentials that are undefined in the data communication standard but that are interpreted as an interrupt signal by an interrupt signal detection circuit,
   wherein the control logic can selectively generate an interrupt signal in either an idle bus state or a busy bus state upon receipt of a request signal on the second input.

* * * * *